(12) United States Patent
Konno (10) Patent No.: US 6,561,823 B1
(45) Date of Patent: May 13, 2003

(54) HOLDER OF SMALL SIZE SOUND DEVICE

(75) Inventor: Hideaki Konno, Tokyo (JP)

(73) Assignee: Polymatech Co., Ltd. (JP)

( * ) Notice: Subject to any disclaimer, the term of this patent is extended or adjusted under 35 U.S.C. 154(b) by 27 days.

(21) Appl. No.: 09/627,765

(22) Filed: Jul. 28, 2000

(30) Foreign Application Priority Data

Aug. 2, 1999 (JP) ............................................ 11-218536
May 22, 2000 (JP) ........................................ 2000-149851

(51) Int. Cl.[7] ................................................. H01R 4/56
(52) U.S. Cl. .......................................... 439/91; 439/86
(58) Field of Search ............................ 439/86, 91, 90, 439/620, 500; 179/428; 379/429, 433, 434

(56) References Cited

U.S. PATENT DOCUMENTS 5,788,516 A * 8/1998 Uggmark ...................... 439/86
5,923,750 A * 7/1999 Enting et al. ................. 379/248
6,017,225 A * 1/2000 Michiya et al. ................ 439/91

FOREIGN PATENT DOCUMENTS

| JP | 9-504661 | 5/1997 |
| JP | 10-233828 | 9/1998 |
| JP | 11-41682 | 2/1999 |

* cited by examiner

*Primary Examiner*—P. Austin Bradley
*Assistant Examiner*—Alexander Gilman
(74) *Attorney, Agent, or Firm*—McGlew and Tuttle, P.C.

(57) ABSTRACT

A holder 1 forming monolithically a holder portion for holding a small size sound device 2 and an elastic conductive connector 11 for electrically connecting said small size sound device 2, wherein an acoustically required communication sound hole 13 is provided on a point corresponding to the sound hole 22 on the back face of the small size sound device 2 and, moreover, a test electrode section 14 used for leak test is provided, separately from the elastic conductive connector 11, without obstructing the acoustically required sound hole 13 on the back face of the small size sound device 2, and allowing also to simplify the mounting process, reduce the production cost, reduce the mounting position space of the small size sound device 2, and facilitate the leak test of the small size sound device 2.

15 Claims, 6 Drawing Sheets

HOLDER OF SMALL SIZE SOUND DEVICE

FIELD OF THE INVENTION

The present invention concerns a holder of small size sound device for holding small size sound devices integrated into portable phone, personal handy-phone system (PHS), personal digital assistant (PDA) or the like, more particularly receiver, speaker, buzzer or similar devices, or module devices integrating them with a vibrator, on a substrate or in a case and connecting them electrically.

RELATED ART

Conventionally, small size sound devices used for portable phone, portable communication apparatus or the like are received inside a holder made of rubber elastic element, then the holder is affixed to a substrate or a case, and electrodes of the small size sound device and those of the substrate are connected by soldering lead wires.

However, the conventional connection method is low in productivity and high in manufacturing cost, because fine lead wires are soldered by hand. Moreover, lead wires require large mounting space, which is contradictory to the recent requirement of portable apparatus miniaturization.

For the case when the small size sound device is a microphone, Japanese Patent Laid-open No. HEI 9 - 504661, Japanese Patent Laid-open No. HEI 10 - 233828, Japanese Patent Laid-open No. HEI 11 - 41682 describe microphone holders wherein a holder portion for holding a microphone and a elastic conductive connector for electrically connecting both electrodes of the microphone and substrate are integrated.

On the contrary, small size sound devices, particularly receiver, speaker, buzzer or similar devices, or module devices integrating them with a vibrator have a hole called sound hole perforated in the main case, as it is necessary to evacuate air vibration generated by the device inner vibration to the outside. However, these conventional microphone holders could not be used, because they obstruct the sound hole on the back face of the small size sound device.

Moreover, as the main case of small size sound devices is metallic, it has been necessary to test the leak of electric insulation with the electrode of the back face by applying a probe.

SUMMARY OF THE INVENTION

The present invention intends to solve the problems mentioned above, and has an object to provide a holder for small size sound devices, particularly receiver, speaker, buzzer or similar devices, or module devices integrating them that will not obstruct the acoustically required hole on their back face, and additionally, that will allow to simplify the mounting process, reduce the production cost, reduce the mounting position space of small size sound devices, and simplify the leak test of small size sound devices.

In other words, it concerns a holder integrating a holder portion for holding a small size sound device and an elastic conductive connector for electrically connecting said small size sound device, wherein an acoustically required communication sound hole is provided on a point opposed to the sound hole on the back face of the small size sound device.

Further, it relates to a holder of small size sound devices provided with a test electrode section used for leak test of small size sound device main case, separately from the elastic conductive connector used for connection between electrodes of small size sound devices and those of the substrate.

Still further, it relates to a holder of small size sound devices, wherein the holder portion is made of rubber elastic element or synthetic resin, while the elastic conductive connector and/or the test electrode section is composed of rubber elastic element and conductive medium.

Still further, it relates to a holder wherein the conductive medium of the elastic conductive connector and/or the test electrode section is magnetic conductive element.

Still further, it relates to a holder characterized by that ribs are formed on the outside face of the holder portion thereof to obtain air-tightness, water-tightness and acoustic insulation With the chamber of the case.

The acoustically required communication sound hole of the present invention is a space not obstructing the sound hole on the bottom face and/or the side face of small size sound devices, and made by perforating a through hole or forming concave groove on the holder. The number and size of through hole or groove are selected conveniently in view of designing.

According to the present invention, by providing a test electrode section used for leak test of small size sound device it-self, separately from the elastic conductive connector used for connection between electrodes of small size sound devices and those of the substrate, leak test is enabled only by applying to the substrate electrode of the leak test substrate to which a resistance meter is connected, even after the mounting of the small size sound device to the holder.

The magnetic conductive element composing the elastic conductive connector and/or test electrode section of the present invention comprises all conductive material presenting magnetism, including magnetic metal particles or magnetic metal complex. When magnetic conductive material is used as conductive medium, a holder portion comprising an elastic conductive connector and/or test electrode section and a rubber elastic element can be formed integrally by a single molding process by injecting magnetic conductive material blended in liquid non-set rubber elastic element into a holder forming die, specifying the conductive passage of the elastic conductive connector and/or test electrode section by magnetically orientating the magnetic conductive material by applying magnetic force to the desired points, and thereafter, by setting the elastic element.

BRIEF DESCRIPTION OF DRAWINGS

FIG. 2 : (*a*) is a top view of a typical small size sound devices, (*b*) is a bottom view;

DETAILED DESCRIPTION OF THE PREFERRED EMBODIMENTS

Now, the present invention will be described in detail referring to attached drawings.

Figure 1:
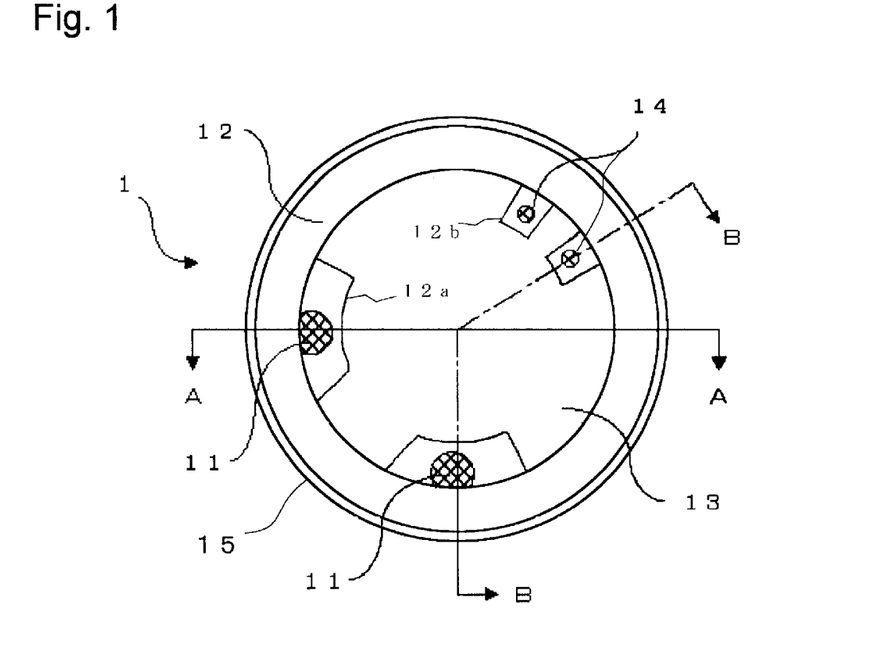
FIG. 1 is a top view of an example of the holder according to the present invention.

In a holder 1, as shown in FIG. 1, an elastic conductive connector 11 for connecting an electrode 21 (FIG. 2) of a small size sound device 2 (FIG. 2) and an electrode 31 (FIG. 3) disposed on a substrate 3 is longitudinally integrated with a wing 12a protruding inside at the lower end of a holder portion 12 made of rubber elastic element for holding the small size sound device, and points opposed to sound holes 22 (FIG. 2) formed around the back face of the small size sound device are opened to define acoustically required communication sound holes 13.

Besides, a test electrode section 14 used for leak test of small size sound device main case is provided on the wing 12b, separately from the elastic conductive connector 11 used for electric connection between the electrode 21 of the small size sound device and the substrate electrode 31. The elastic conductive connector 11 forms a conductive pattern so that the electrode 21 of the small size sound device and the substrate electrode 31 can be connected to electrodes corresponding thereto.

Figure 2:
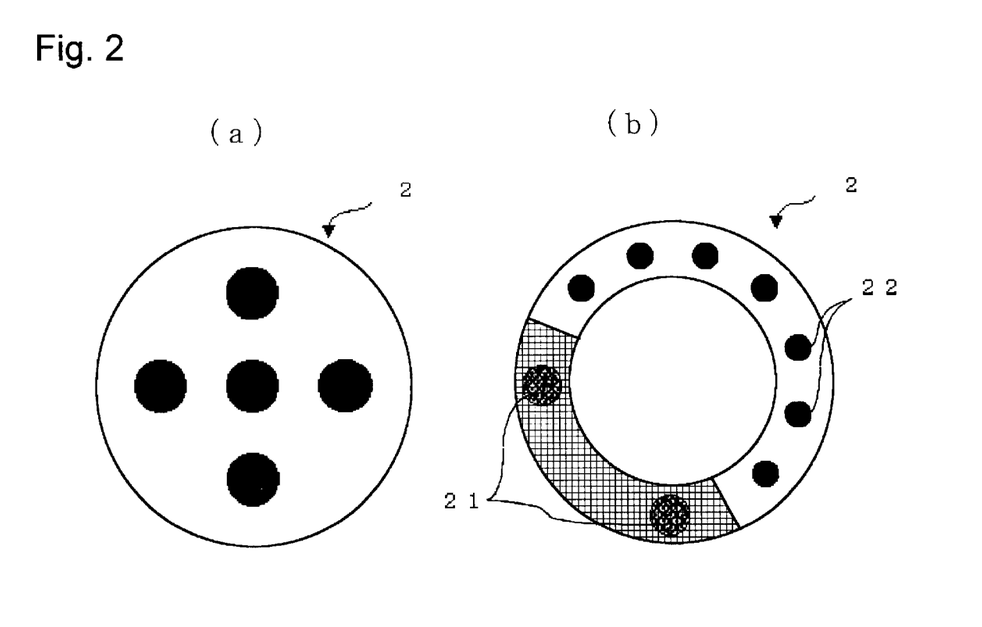
Figure 3:
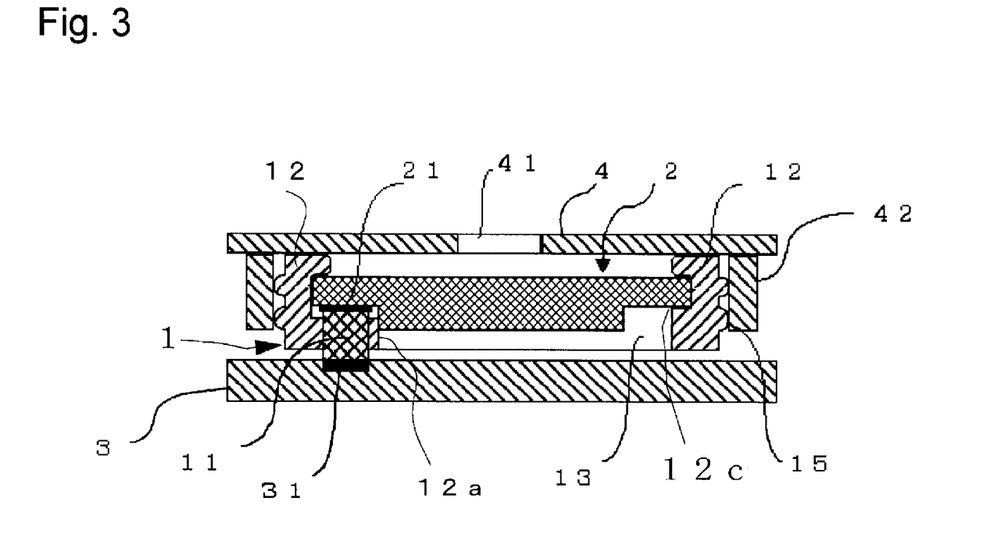
FIG. 3 is an example of mounting along the section A—A of FIG. 1.

FIG. 3 is a longitudinal cross-section view showing the section along the line A—A of FIG. 1, when the small size sound device 2 shown in FIG. 2 is integrated into the holder 1 of the present invention, and inserted between the substrate 3 and a case 4.

The small size sound device 2, integrated into the holder 1, is engaged in a traverse groove 12c defined in the inner wall of the holder portion 12, and the electrode 21 at the bottom face of the small size sound device 2 comes into contact with the elastic conductive connector 11. As the holder 1 is pinched between the substrate 3 and the case 4, the elastic conductive connector 11 is compressed assuring the conductivity with the electrode 31 of the substrate 3.

Figure 4:
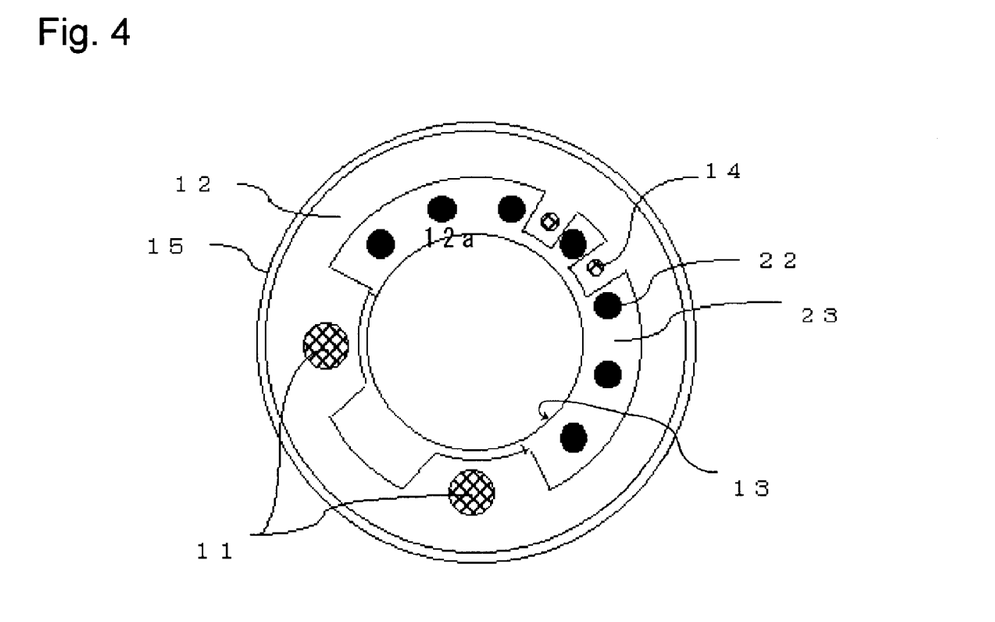
FIG. 4 is a bottom view when a small size sound device is integrated into a holder.

Here, as shown in the bottom view of FIG. 4, when the small size sound device is integrated into the holder, the communication sound hole 13 opened at the lower portion of the holder does not obstruct the sound hole 22 at the back face of the small size sound device 2 and, therefor, does not affect the acoustic characteristics of the device.

Figure 5:
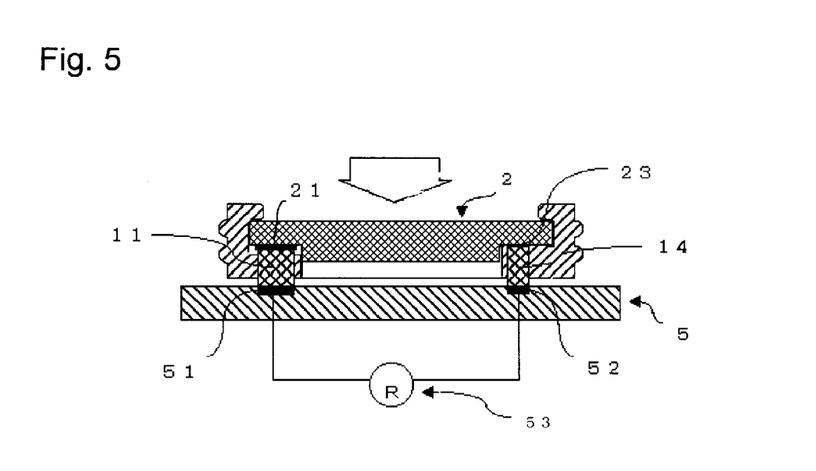
FIG. 5 is a schematic view of a leak test method across the section B—B of FIG. 1.

FIG. 5 is a schematic diagram of the leak test method of a mounting electric component across the cross-section along the line B—B of FIG. 1.

The test electrode section 14, is made by forming a conductive passage with a conductive medium in the rubber elastic element and integrated longitudinally with a wing 12b protruding inside at the lower end of a cylindrical holder portion 12 made of a rubber elastic element holding the small size sound device, and the upper end thereof is in contact with the main metal case 23 of the small size sound device 2. At the same time, the electrodes 21 of the small size sound device 2 are in contact with the elastic conductive connector 11, and are respectively in contact with the electrode 51 and the electrode 52 of the leak test substrate 5.

At this moment, if the electrode 21 of the small size sound device and the small size sound device main metal case 23 are electrically connected (leakage) under a light load to the small size sound device, the value measured by a resistance meter 53 connected to the substrate electrode drops. Namely, leak test can be realized by a simple operation of applying a light load to the small size sound device. Thus, the leak test of small size sound device it-self can be simplified by providing previously the holder 1 with a test electrode section 14 in contact with the small size sound device main metal case 23.

The material of the holder portion and the elastic conductive connector and/or test electrode section of the present invention includes rubber elastic elements such as silicone rubber, natural rubber, isoprene rubber, butadiene rubber, 1,2-polybutadiene, styrene-butadiene rubber, chloroprene rubber, nitrile rubber, butyl rubber, ethylene-propylene rubber, chlorosulfuric polyethylene, acrylic rubber, 1-chloro-2,3-epoxypropane, fluororubber, urethane rubber, styrene base thermoplastic elastomer, olefin base thermoplastic elastomer, ester base thermoplastic elastomer, urethane base thermoplastic elastomer, amide base thermoplastic elastomer, PVC base thermoplastic elastomer, fluoride base thermoplastic elastomer, ion reticulation base thermoplastic elastomer, or the like. Among them, silicone rubber is preferable in view of its electric insulation and weather resistance.

Besides the use of rubber elastic elements, according to the required specifications, the holder portion of the holder of the present invention can be made of rigid resins including, par example, ABS resin, PET, PBT, polyester, polypropylene, polyethylene, polyurethane, polyamide, polyethylene vinyl acetate, PVC, or the like.

For the elastic conductive connector and/or test electrode section of the present invention, one made by forming a conductive passage with a conductive medium in the rubber elastic element is used. Conductive medium of low electric resistance is used in consideration of characteristics of the small size sound device. Preferably, its contact resistance is equal or inferior to 10 Ω, and conductive medium such as carbon or metal particle, fiber, fine wire or the like are used. To be more specific, powder or fine wire of metals such as low resistant gold, silver, platinum, copper, iron, aluminum, nickel, palladium, cobalt, chrome, or alloys of stainless steel, or powder or fine wire of metal complex of resin or ceramic whose surface is covered with metal can be used.

When a magnetic conductive element is used as conductive medium for the elastic conductive connector and/or test electrode section of the present invention, a holder portion comprising an elastic conductive connector and a rubber elastic element can be formed integrally by a single molding process by injecting magnetic conductive material blended in liquid non-set rubber elastic element into a holder forming die, specifying the conductive passage of the elastic conductive connector by magnetically orientating the magnetic conductive material by applying magnetic force to the desired points, and thereafter, by setting the rubber elastic element. Magnetic conductive element is preferably nickel, cobalt, iron or alloy containing them in quantity; besides, high conductive metals plated with magnetic conductive element or, on the contrary, magnetic conductive elements plated with high conductive metal can be used.

Embodiment 1

Figure 6:
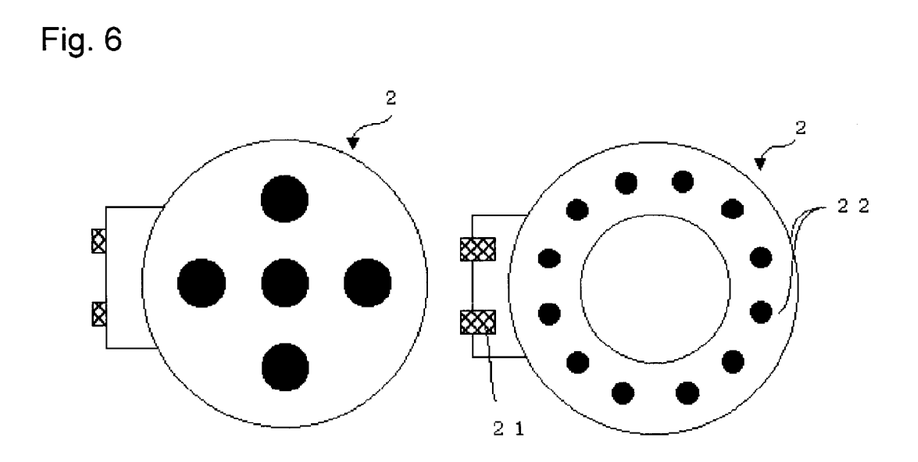
FIG. 6 is a top view and bottom view of a small size sound devices of an example 1.
Figure 7:
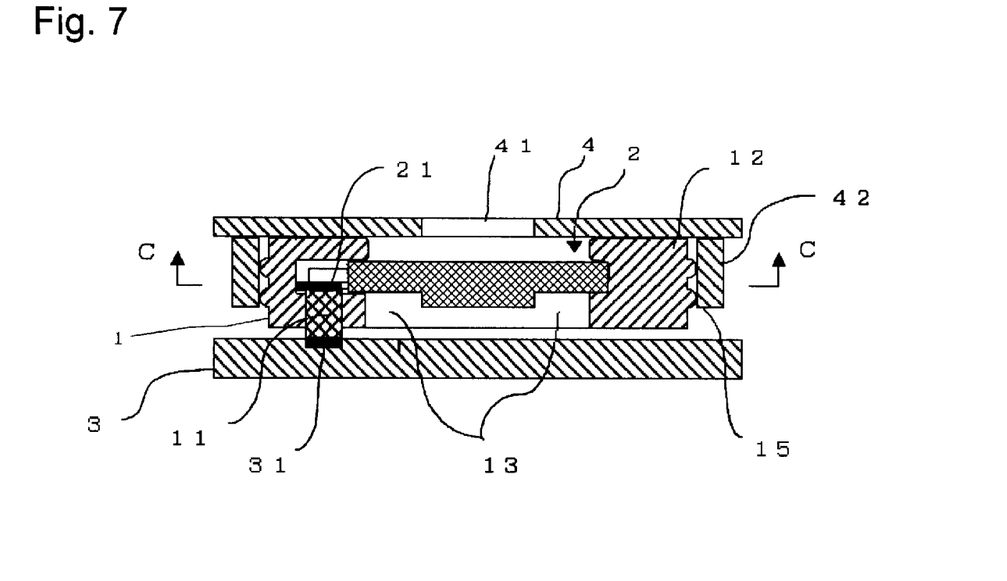
FIG. 7 is a longitudinal section view of mounting of the holder of the example 1.

FIG. 7 shows an example of structure wherein the small size sound device 2 shown in FIG. 6 is mounted between the case 4 and the substrate 3 using a holder.

Figure 8:
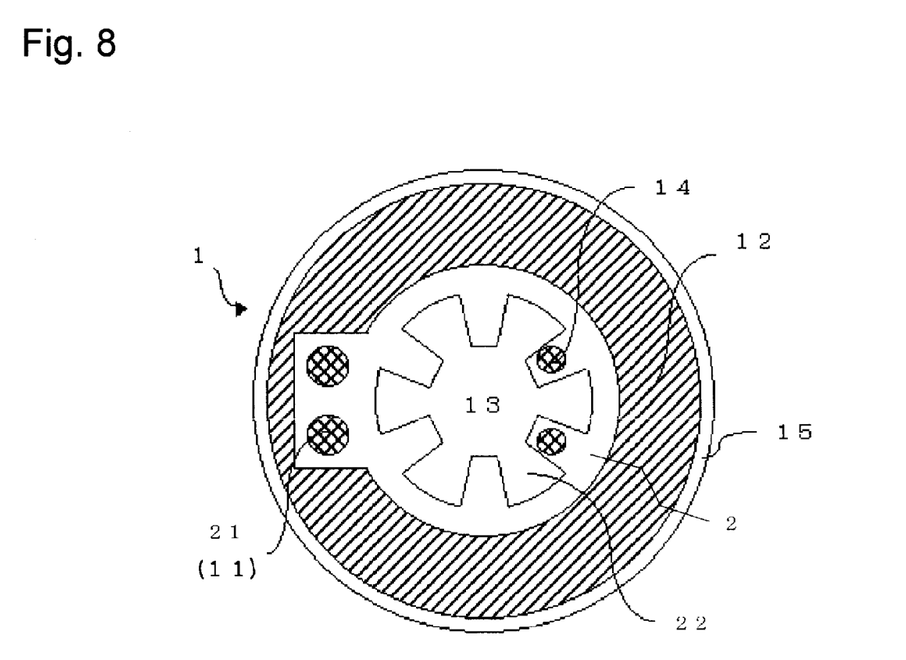
FIG. 8 is a cross-section view along C—C of FIG. 7.

FIG. 8 is a cross-section view along the line C–C of FIG. 7.

The electrode 21 of the small size sound device 2 protrudes laterally from the device main body, and the sound hole 22 on the back face is spread all around the circumference. The electrical connection between the electrode 21 of the small size sound device 2 and the electrode 31 of the substrate 3 is realized using an elastic conductive connector 11, and the holder portion 12 of the holder 1 is integrated with the elastic conductive connector 11 to simplify the mounting thereof. Besides, a leak test electrode section 14 of the device it-self is provided separately. Moreover, a communication sound hole 13 is provided on the holder 1 in a way not to obstruct the sound hole 22 on the back face of the small size sound device 2.

As conductive medium for elastic conductive connector and/or test electrode section, magnetic conductive nickel particle is used, while silicone rubber, rubber elastic element, is used for the holder portion. An integrally molded holder is made by injecting nickel particle blended in liquid non-set silicone rubber into a holder forming die, defining a conductive passage in the elastic conductive connector and/or test electrode section by magnetically orientating the nickel particle by applying magnetic force only to the points forming the elastic conductive connector and/or test electrode section, and at the same time, by vulcanizing the silicone rubber.

In practice, the holder 1 already assembled with the small size sound device 2 is mounted in a chamber 42 of the case 4 provided with a hole 41 at the desired position. When the case 4 is mounted on the substrate 3 with screw (not shown) or the like, elastic conductive connector 11 is compressed, and the electrode 21 of the small size sound device 2 and the electrode 31 of the substrate 3 are connected electrically. Here, as the rib 15 is formed on the holder 1, the airtightness, water tightness and acoustic sealing performance will be assured with the chamber 42 of the case 4.

By using thus obtained holder, the small size sound device can be mounted simply only by assembling each ones, eliminating the process of connecting lead wires or the like by solder.

Embodiment 2

Figure 9:
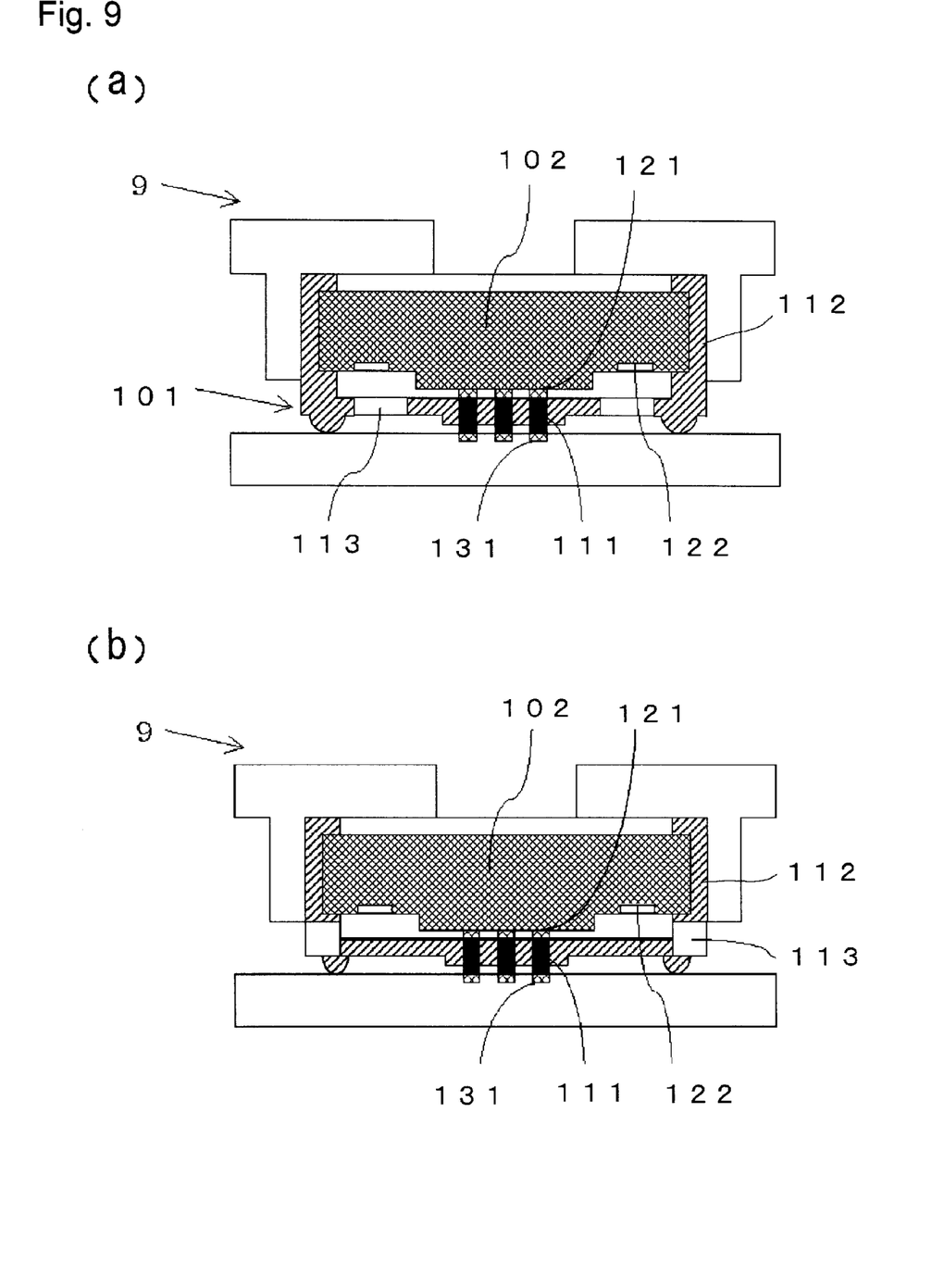
FIG. 9 is a longitudinal section view of mounting of the holder of the example 2.

In the case of FIG. 9, the small size sound device 102 has an electrode 121 at the center of the back face. In this example, the holder 101 is made as vessel shaped holder portion 132, and an elastic conductive connector 111 for connecting the electrode 121 of the small size sound device and the substrate electrode 131 is longitudinally integrated with the middle of the bottom face, and communication sound holes 113 are provided around the periphery of its bottom face.

The small size sound device 102 is pushed into the holder 101 and engaged into the traverse groove formed in the inner wall of the holder portion 112, thereby compressing the electrode 121 on the back face of the small size sound device 102 and the elastic conductive connector 111 and assuring conduction with the substrate electrode 131.

In this case, the communication sound hole 113 may also be positioned at the corner of the bottom face as shown in FIG. 9b.

Embodiment 3

Figure 10:
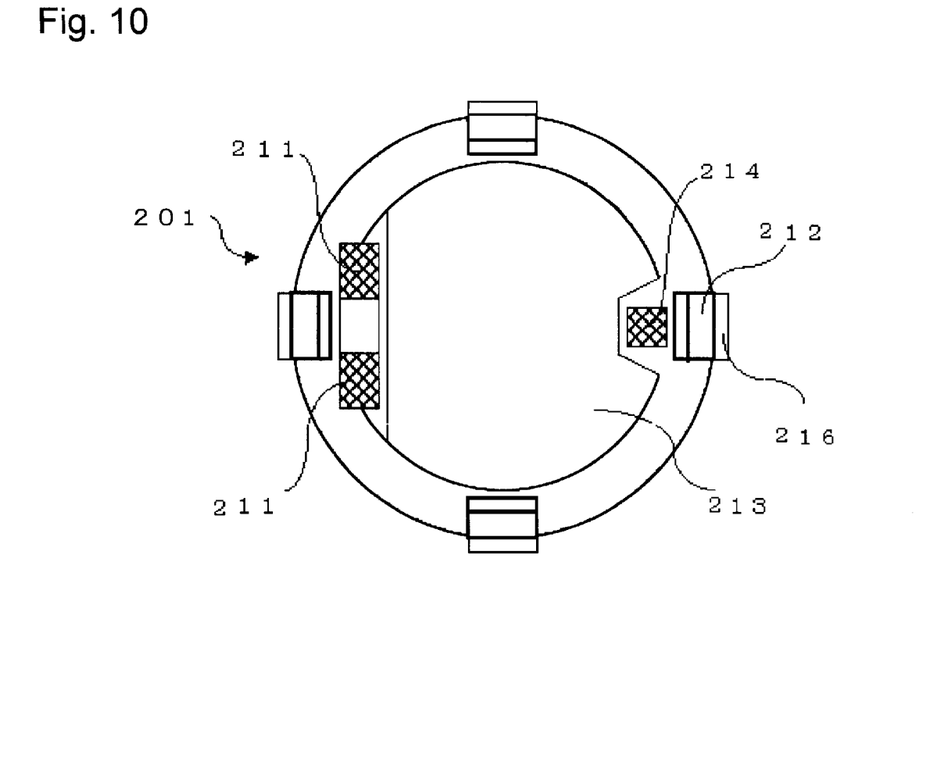
FIG. 10 is a top view of a holder of an example 3.
Figure 11:
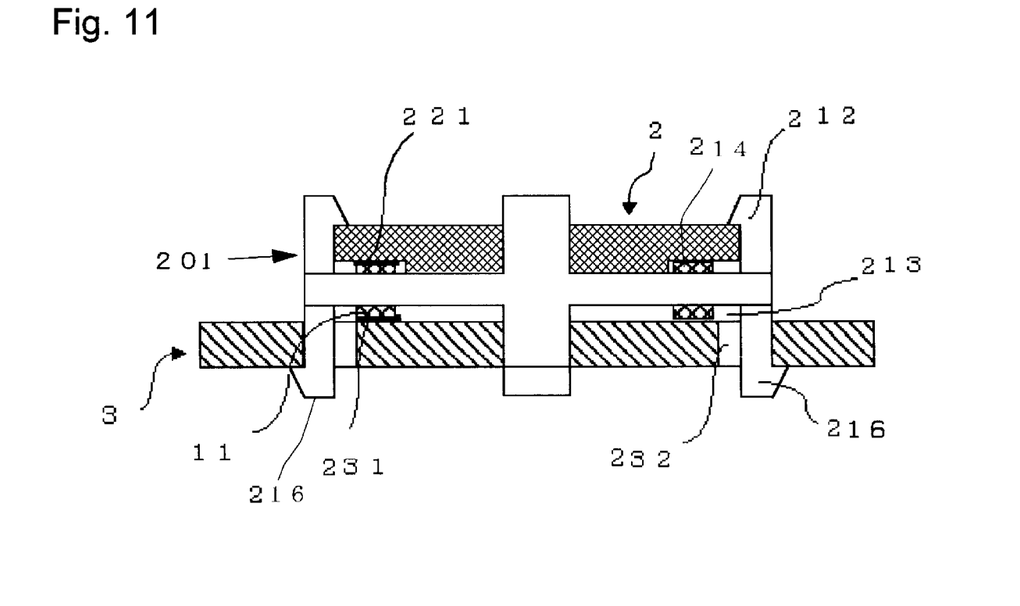
FIG. 11 is a side view of mounting example of the holder of the example 3.

FIG. 10 shows the top face of a holder 201 using rigid body made of synthetic resin for the holder portion 212. FIG. 11 shows an example of structure wherein the small size sound device 2 is assembled with the substrate using this holder.

A small size sound device 2 having the structure shown in FIG. 2 is used. Both the electrode 221 and the sound hole exist at the back face of the small size sound device 2.

The electrode 221 of the small size sound device 2 and the electrode 231 of the substrate 3 are electrically connected by an elastic conductive connector 211, and the holder portion 212 of the holder 201 is integrated with the elastic conductive connector 211 so as to simplify the mounting of the small size sound device 2. Besides, a leak test electrode section 214 of the device it-self is provided separately. Moreover, a communication sound hole 213 is provided on the holder 201 in a way not to obstruct the sound hole on the back face of the small size sound device 2.

As elastic conductive connector 211, silicone rubber, blended with quantity of conductive carbon black to reduce the resistance, is used., and ABS resin is used for the holder portion 212, and the holder 201 is made by assembling them integrally.

In practice, the small size sound device 2 is mounted on the holder portion 212 of the holder 2, and a mounting ratchet section 216 of the holder 201 is engaged with the mounting hole 32 of the substrate and then affixed. Thus, the elastic conductive connector 11 is compressed, and the electrode 21 of the small size sound device 2 and the electrode 231 of the substrate 3 are connected electrically. By using thus obtained holder, the small size sound device can be mounted simply only by assembling each ones, eliminating the process of connecting lead wires or the like by solder.

Since the holder according to the present invention integrates the holder portion and the elastic conductive connector using for assembling with the substrate, without obstructing the acoustically required sound hole on the back face of small size sound devices such as receiver or the like used for portable phone or others, it would not affect the acoustic characteristics, eliminates the process of connecting lead wires or the like by solder, and moreover, reduces the number of parts and the number of man-hour, allowing to lower the manufacturing cost. Moreover, water-tightness and acoustic sealing may also be expected.

Additionally, the installation of a test electrode section for leak test allows to realize the leak test only by forming monolithically the small size sound device with the holder and press-fitting with the test substrate electrode.

Also, by the use of magnetic conductive element as conductive medium, the integral mounting can be realized only by a single molding process, reducing the number of holder manufacturing process than the method wherein the holder portion and the elastic conductive connector are formed separately and then integrated by assembling them, thus permitting to cut the manufacturing cost.

What is claimed is:

1. A sound holder arrangement comprising:

a sound device having first and second diametrically opposite sides, said first side emitting sound, said second side having a vibration evacuation hole and a sound electrode, a holder connected to said sound device, said holder having first and second diametrically opposite ends, each of said first and second ends said of said holder defining openings, said opening in said first end of said holder defining a passage to said first side of said sound device, said opening in said second end defining an evacuation passage to said vibration evacuation hole, a substrate with substrate electrodes arranged at said second end of said holder, said substrate defining a portion of said evacuation passage leading to a surrounding environment;

a plurality of elastic conductive connectors formed as a part of said holder and arranged in openings in said plurality of tabs said second end of said holder, said elastic conductive connectors electrically connecting said sound electrodes said sound device with said substrate electrodes of said substrate.

2. An arrangement in accordance with claim 1, wherein: said sound device is one of a speaker and a buzzer.

3. An arrangement in accordance with claim 1, wherein: said sound device includes an additional sound hole positioned on said first side of said sound device diametrically opposite said sound hole and emitting communication sound.

4. An arrangement in accordance with claim 1, wherein:
said sound device is one of a speaker and a buzzer;
said sound device includes an additional sound hole positioned on said first side of said sound device diametrically opposite said sound hole and emitting communication sound;
each elastic conductive connector is formed of magnetic material in an elastic material, said magnetic material being oriented in said elastic material by applying a magnetic force when the elastic material is liquid.

5. A sound holder arrangement in accordance with claim 1, wherein the holder is provided with a test electrode section used for leak testing of a small size sound device main case separately from the elastic conductive connectors used for connection between said electrode of said sound device and said substrate electrode.

6. A sound holder arrangement in accordance with claim 5, wherein the holder is made of rubber elastic element or synthetic resin, while each elastic conductive connector and/or the test electrode section is composed of rubber elastic element and conductive medium.

7. A sound holder arrangement in accordance with claim 5, wherein the conductive medium of each elastic conductive connector and/or the test electrode section is a magnetic conductive element.

8. A sound holder arrangement in accordance with claim 1, wherein the holder is, made of a rubber elastic element or a synthetic resin, while the elastic conductive connectors are composed of rubber elastic element and conductive medium;
said sound device includes a plurality of individual sound electrodes arranged in a circular pattern on said sound device;
said substrate includes a plurality of individual substrate electrodes arranged in a circular pattern on said substrate;
said elastic conductive connector individually and electrically connecting each of said plurality of said sound electrodes of said sound device with said plurality of said substrate electrodes of said substrate.

9. A sound holder arrangement in accordance with claim 8, wherein the conductive medium of each elastic conductive connector and/or the test electrode section is a magnetic conductive element.

10. A sound holder arrangement in accordance with claim 1, wherein the conductive medium of each elastic conductive connector is a magnetic conductive element.

11. A sound holder arrangement in accordance with claim 10, wherein the magnetic conductive element composing the conductive medium of each elastic conductive connector and/or the test electrode section is magnetically oriented by applying a magnetic force, and thereby a conductive passage is defined in the elastic conductive connector and/or the test electrode section.

12. A sound holder arrangement comprising:
a sound device having first and second diametrically opposite sides, said first side emitting sound, said second side having a vibration evacuation hole and a sound electrode;
a holder connected to said sound device, said holder having first and second diametrically opposite ends, each of said first and second ends of said holder defining openings, said opening in said first end of said holder defining a passage to said first side of said sound device, said opening in said second end defining an evacuation passage to said vibration evacuation hole;
a substrate with a substrate electrode arranged at said second end of said holder, said substrate defining a portion of said evacuation passage leading to a surrounding environment;
an elastic conductive connector formed as a part of said holder and arranged in said second end of said holder, said elastic conductive connector/electrically connecting said sound electrode of said sound device with said substrate electrode of said substrate;
ribs formed on an outside face of the holder to obtain air-tightness, water-tightness and acoustic sealing performance with respect to a chamber of a case.

13. A sound holder arrangement comprising:
a sound device having first and second diametrically opposite sides, said first side emitting sound, said second side having a vibration evacuation hole and a sound electrode;
a holder connected to said sound device, said holder having first and second diametrically opposite ends, each of said first and second ends of said holder defining openings, said opening in said first end of said holder defining a passage to said first side of said sound device, said opening in said second end defining an evacuation passage to said vibration evacuation hole;
a substrate with a substrate electrode arranged at said second end of said holder, said substrate defining a portion of said evacuation passage leading to a surrounding environment;
an elastic conductive connector formed as a part of said holder and arranged in said second end of said holder, said elastic conductive connector electrically connecting said sound electrode of said sound device with said substrate electrode of said substrate, said elastic conductive connector being formed of magnetic material in an elastic material, said magnetic material being oriented in said elastic material by applying a magnetic force when the elastic material is liquid.

14. A sound holder arrangement comprising:
a sound device having first and second diametrically opposite sides, said first side emitting sound, said second side having a vibration evacuation hole and a sound electrode;
a sound hole formed on a back face of said sound device,
a holder connected to said sound device, said holder having first and second diametrically opposite ends, each of said first and second ends of said holder defining openings, said opening in said first end of said holder defining a passage to said first side of said sound device, said opening in said second end defining an evacuation passage to said vibration evacuation hole;
a substrate with a substrate electrode arranged at said second end of said holder, said substrate; defining a portion of said evacuation passage leading to a surrounding environment;
an elastic conductive connector formed as a part of said holder and arranged in said second end of said holder, said elastic conductive connector electrically connecting said sound electrode of said sound device with said substrate electrode of said substrate,
wherein said sound device internally generates air vibrations which need to be evacuated outside, said sound device for said sound device to operate, and said sound hole of said sound device and said evacuation passage evacuates said air vibrations.

15. A sound holder arrangement comprising:

a substrate with a substrate electrode;

a holder portion defining a sound device cavity, said holder portion having first and second diametrically opposite ends, each of said first and second ends of said holder portion defining; openings;

a sound device arranged in said sound device cavity of said holder portion, said sound device having an acoustically required sound hole in communication with said opening in said second end of said holder portion, said sound device internally generating air vibrations which need to be evacuated outside said sound device for said sound device to operate, said sound hole of said sound device and said opening in said second end of said holder portion evacuating said air vibrations;

an elastic conductive connector arranged in said second end of said holder portion, said elastic conductive connector electrically connecting an electrode of the sound device with said electrode of said substrate;

a case defining a chamber receiving said first end of said holder portion, said case defining a hole in communication with said chamber and said opening in said first end of said holder portion.

* * * * *